United States Patent Office 3,829,369
Patented Aug. 13, 1974

3,829,369

4-METHOXY BENZENE DIAZONIUM HEXAFLUOROPHOSPHATE CATALYST FOR PHOTOPOLYMERS IN EPOXY SYSTEMS

Jacob Howard Feinberg, Hightstown, N.J., assignor to American Can Company, Greenwich, Conn.

No Drawing. Filed Oct. 19, 1972, Ser. No. 298,847
Int. Cl. B01j *1/10;* C08d *1/00*
U.S. Cl. 204—159.11 20 Claims

ABSTRACT OF THE DISCLOSURE

A process for polymerization of epoxide monomers and prepolymers employing 4-methoxybenzene diazonium hexafluorophosphate as a latent radiation-sensitive initiator comprising subjecting admixtures of the catalyst and epoxide to the application of energy.

BACKGROUND OF THE INVENTION

In copending U.S. application Serial No. 753,869 filed August 20, 1968, entitled "Photopolymerization of Epoxy Monomers, now U.S. Pat. 3,708,296 issued Jan. 2, 1973, there are disclosed epoxide-containing materials which are photopolymerizable via use of aromatic diazonium catalyst precursors which are radiation-sensitive and which release an active catalyst upon exposure to actinic radiation.

It has now been discovered that a specific aryl diazonium salt, broadly disclosed in said copending application, possesses advantages over closely related initiators of the class defined and is unique in exhibiting improved shelf life and imparting less color formation when employed to initiate polymerization of epoxy compositions.

This invention then relates to a process for polymerizing epoxy monomers and more particularly to a process for effecting the photopolymerization of epoxy monomers by use of a compound which is photosensitive and releases an active catalyst upon exposure to radiation. The term epoxy monomer in the description of this invention and the appended claims hereto is meant to include any molecule containing one or more epoxy or oxirane rings, whether the molecule consists of a small grouping of atoms or of a chain of repeating units as in commercial resins. Thus, this invention includes the treatment of commercial epoxy resins, sometimes referred to as prepolymers, which consist of smaller molceular units which have been linked together to give longer chains with pendant epoxy groups which are capable of further polymerization and described more fully hereinbelow.

Previously, isolated instances have been reported in the literature wherein epoxy monomers have been polymerized by the action of electromagnetic radiation. This can be achieved by selecting a region of the electromagnetic spectrum to which the monomer responds to form an initiating species that causes the polymer chain to grow. For example, Penezek et al. in *Die Makromolekular Chemie,* 97 (1966) have reported that gamma radiation will effect polymerization of cyclohexene oxide, an epoxy monomer. However, this type of reaction does not generally occur with most epoxy monomers and additionally gamma radiation is not a convenient source of radiation and not as useful as the ultraviolet and visible regions of the spectrum. Therefore, heretofore polymerization of epoxy monomers has been carried out by heating the monomer in which a chemical compound was incorporated, until catalysts contained therein were activated. The activation of the catalyst upon heating thereby initiated polymerization of the epoxy monomers. These methods, though successful, are unsatisfactory in that careful attention must be given to staying within the temperature limitations of the system involved. In order to prevent the harmful effects of heat curing, it is often necessary to extend the curing cycle an unreasonable length of time.

Recently workers in the art have discovered a method wherein some of the above deficiencies are overcome. See for example U.S. Pat. 3,205,157. Briefly, this method proposes the use of aryldiazonium fluoroborate compounds as photosensitive agents, which upon exposure to radiation release an active catalyst which initiates the polymeribation of epoxy monomers to produce epoxy polymers. However, photosensitive compounds disclosed by the prior art tend to be chemically unstable resulting in the disadvantages of extremely short pot life and being potentially explosively hazardous. Additionally, epoxy monomer systems catalyzed with the photosensitive compounds of the prior art have been found to be poorly-receptive to ink, a critical property in the field of graphic arts. Furthermore as disclosed in copending application Ser. No. 753,869, the catalyst activity and resulting usefulness of aryldiazonium compounds cannot be determined on a random basis and many aryldiazonium compounds do not possess the requisite properties necessary to catalyze the wide variety of epoxy monomers previously defined herein. Accordingly, it is desirable to identify and discover new and improved epoxy monomer catalyzing agents useful in the photopolymerization process which are not subject to and overcome the deficiencies now existing in the art.

Moreover, when a flowable liquid composition is applied to a substrate to form a coating or decoration, or to provide graphic or other information, it may be advantageous shortly after application to obtain rapid hardening, gelling, or curing of the coated material by irradiation for a brief period of time. This is particularly advantageous if the liquid coating composition is substantially free of volatile solvents which do not themselves participate in the curing, since the hardening then may be effected very rapidly without interference from evolving vapors and without producing waste gases. Practical coating systems of these types have been developed, utilizing photosensitive latent curing catalysts which respond to irradiation by releasing the catalytic agent.

One such coating system as described in copending application Ser. No. 144,668, filed May 18, 1971, utilizes epoxide compounds (or mixtures) of relatively low molecular weight, which may be formulated to provide good flow characteristics with or without the use of inert solvents. Cationic polymerization catalysts cause the epoxy ring to open through cleavage of a carbon-oxygen band, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

The advantages of such radiation responsive catalytic polymerization are made apparent by comparison with other available systems. Polymerization and crosslinking of epoxide compounds have been carried out by a variety of methods; see, for example, Chapter 5 of "Handbook of Epoxy Resins" by H. Lee and K. Neville, McGraw-Hill Book Company, 1967. A disadvantage of many of the so-called curing reactions is that they begin immediately on mixing reactants. Many of the curing techniques are based on two-component systems in which the two components must be isolated from each other until the curing reaction is to take place. Thus, only that quantity of material is mixed which can be used at once. Many of the curing reactions are slow and are unsuitable for applications which require a rapid transformation from the liquid or thermoplastic state to the solid state. Heat is frequently applied to stimulate or expedite reaction, but this is especially undesirable in applications where the epoxide material is in contact with a heat-sensitive material or where the reduction in viscosity on heating would cause "run-off" of the resin before curing takes place. Careful attention must be given to staying within the temperature limitations of the system involved. Again, in order to prevent harmful effects of thermal curing, it is often necessary to extend the curing cycle an unreasonable length of time.

However, epoxide and related compositions containing photosensitive catalyst precursors have a tendency to gel upon standing, even in the absence of light or ultraviolet radiation. This tendency to undergo premature reaction is particularly troublesome in the case of formulations which are substantially free of unreactive diluents or solvents. The polymerization reaction is exothermal and, where large masses are involved, can generate sufficient heat to cause combination of the epoxide resins.

In copending U.S. application Ser. Nos. 144,665, 144,666, 144,642, and 144,667, each filed May 18, 1971, now U.S. Pat. Nos. 3,711,391; 3,711,390, 3,721,617 and 3,721,616, respectively, various stabilizers or gelation inhibitors are provided for such epoxide and related compositions containing photosensitive catalyst precursors. It has now been found that the 4-methoxy-benzene diazonium hexafluorophosphate catalyst of this invention when incorporated into such stabilized compositions exhibits a surprisingly extended shelf life when compared to compositions containing closely related catalysts and the same reaction stabilizers. It has further been found that epoxy compositions containing the radiation-sensitive catalyst of this invention exhibit a degree of shelf-life and storability which is extended even in the absence of stabilizers. This is particularly surprising since very closely related catalyst precursors do not exhibit this property as illustrated further hereinbelow.

SUMMARY OF THE INVENTION

Accordingly, a new and improved radiation-sensitive catalyst which is an aryldiazonium compound has been discovered which upon admixture with an epoxy monomer and subsequent exposure to an energy source releases an active catalyst which effects the polymerization of the epoxy monomer. The new radiation-sensitive catalyst possesses the properties of increased speed and efficiency in catalyzing polymerization and in yielding epoxy polymers which are receptive to ink, possess inherent superior toughness, abrasion resistance, adhesion to metal surfaces, resistance to chemical attack, and decreased color formation. The radiation-sensitive compound additionally imparts increased shelf life to epoxy composition which are admixed with it.

DETAILED DESCRIPTION OF THE INVENTION

The 4-methoxybenzene diazonium hexafluorophosphate catalyst of this invention is readily available commercially or may be prepared from procedures known in the art and such preparation forms no part of the pesent invention. It may be prepared, for example, by diazotizing the corresponding aniline with $NOPF_6$, a HCl–$NaNO_2$ combination with subsequent addition of $HPF_6$ or a $PF_6^-$ salt or by addition of $PF_6^-$ salt to another diazonium salt to effect precipitation. The pure compound, represented by the general structure

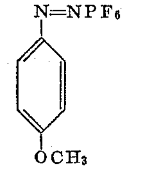

is white and exhibits an absorption maximum (in acetonitrile) in the ultraviolet region of the spectrum at 313 mu which makes it particularly suitable as a catalyst for light-cured systems and for those formulations where minimizing color formation is an important factor.

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment, any polymerizable, monomeric or prepolymeric epoxide material or mixture of such epoxide materials, of suitable viscosity alone or when dissolved in a suitable solvent, many be utilized. The classic epoxy resin is obtained by the well known reaction of epichlorohydrin and bisphenol A (4,4-isopropylidenediphenol). The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

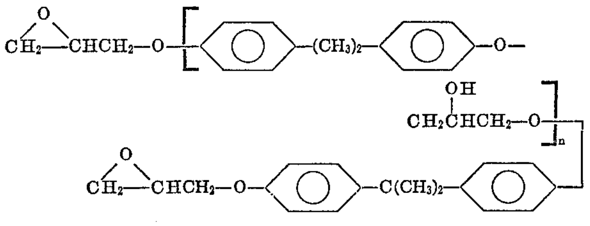

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n$=O), which may be named 2,2-bis[p-(2,3-epoxypropoxy) phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy rings is initiated by the action of the Lewis acid halide released when energy it applied to the latent polymerization catalyst.

Many other epoxide materials are available in polymerizable monomeric or prepolymeric forms. Among these are 1,2-epoxycyclohexane (cyclohexene oxide, also named 7-oxabicyclo-[4.1.0]heptane); and vinylcyclohexene dioxide, more specifically named 3-(epoxyethyl)-7-oxabicyclo[4.1.0]heptane or 1,2-epoxy - 4 - (epoxyethyl)cyclohexane. Ethylene oxide (oxirane,

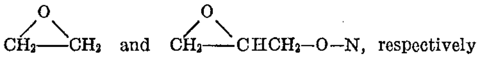

the simplest epoxy ring) and its homologues generally, e.g., propylene oxide (1,3-epoxypropane) and 2,3-epoxybutane, are themselves useful; other useful epoxidic cyclic ethers are the $C_3O$ ring compound trimethylene oxide (oxetane), derivatives thereof such as 3,3-bis(chloromethyl)oxetane (also named 2,2-bis(chloromethyl)-1,3-epoxypropane), and the $C_4O$ ring compound tetrahydrofuran, as examples. Other epoxidized cycloalkenes may be used, a readily available polycyclic diepoxide being dicyclopentadiene dioxide, more specifically identified as 3,4-8,9-diepoxytricyclo[$5.2.1.0^{2,6}$]decane. A suitable cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and glycidyl phenyl ether (1,2-epoxy-3-phenoxypropane). Another readily available product is a mixture of ethers of the structure

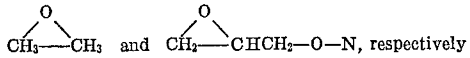

where R is akyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolak prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4-epoxycyclohexanecarboxylate; this same ester may be indexed under the name 7-oxabicyclo[4.1.0]hept-3-ylmethyl 7 - oxabicyclo[4.1.0]heptane-3-carboxylate. Another suitable diepoxide may be obtained as an ester of a substituted (epoxycycloalkyl) methanol and dibasic acid, for example, bis[3,4-epoxy-6-methylcyclohexyl) methyl] adipate, which may be named alternatively bis[(4-methyl-7-oxabicyclo[4.1.0]hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(3-epoxypropoxy)butane. This diepoxide is related to the diglycidyl ether of bisphenol A, shown above as 2,2-bis[p-(2,3-epoxypropoxy)phenyl]propane.

Lactones tend to be readily polymerizable under the action of a cationic catalyst such as a Lewis acid. Thus beta-propiolactone and epsilon-hexanolactone (epsilon-caprolactone) may be used in the process and composition of the present invention, as well as other lactones disclosed in copending application Ser. No. 292,759 filed Sept. 27, 1972 entitled "Photopolymerization of Lactones."

Further, the polymerization of ethylenic materials likewise may be initiated by cationic catalysts. Examples of this type of polymerizable materials are styrene, isobutyl vinyl ether, and 9-vinylcarbazole. Diketone is both ethylenic (viewed as 4-methylene-2-oxetanone) and a lactone (viewed as the beta-lactone of 3-butenoic acid).

The latent polymerization initiator of the process and compositions of the present invention is a radiation-sensitive catalyst precursor which decomposes to provide a Lewis acid upon application of energy. The energy required for effective decomposition may be thermal energy, applied simply by heating, or may be energy applied by bombardment with charged particles, notably by high-energy electron beam irradiation. Preferably, however, since the catalyst precursor is photosensitive, the required energy is imparted by actinic irradiation, which is most effective at those regions of the electromagnetic spectrum at which there is high absorption of electromagnetic energy by the catalyst precursor particularly in the range of about 300–350 mu. More than one of these types of energy may be applied to the same system; e.g., ultraviolet light irradiation followed by electron beam irradiation, and post-heating also may be employed, although it is a particular and distinguishing feature of the present initiator that irradiation can effect a suitable cure and post-heating is unnecessary.

The present photosensitive catalyst belongs to the class of aromatic diazonium salts of complex halogenides disclosed in copending application Ser. No. 753,869, which decompose upon application of energy to release a halide Lewis acid. The aromatic diazonium cation may be represented generally as $[Ar\text{-}N{\equiv}N]^+$, where the aryl group Ar, which is 4-methoxybenzene, is bonded to the diazonium group by replacing one of the hydrogen atoms on a carbon atom of the aromatic nucleus, and where the methoxy substituent of the aryl group contributes greater stability of the cation. The complex halogenide anion may be represented by $[PF_6]^-$. Thus, the photosensitive salt and its decomposition upon actinic irradiation may be depicted as follows:

$$[ArN{=}N]^+[PF_6]^- \xrightarrow{h\nu} ArF + N_2 + PF_5$$

The Lewis acid halide $PF_5$ is an electron pair acceptor, which upon suitable irradiation of the diazonium complex salt is released in substantial quantities and initiates or catalyzes the polymerization process, wherein the monomeric or prepolymeric material is polymerized or cured as the result of the actinic irradiation.

As discussed earlier hereinabove, the compositions of the invention may include various stabilizers or gelation inhibitors. The stabilizers may be sulfoxides as disclosed in U.S. Ser. No. 144,665, filed May 18, 1971; acyclic amides and ureas as disclosed in U.S. Ser. No. 144,666, filed May 18, 1971; cyclic amides as disclosed in U.S. Ser. No. 144,642, filed May 18, 1971; and organic nitriles as disclosed in U.S. Ser. No. 144,667, filed May 18, 1971, the disclosures of the aforegoing applications being incorporated herein by reference. When employed, the stabilizers are utilized in amounts which may vary from about 0.005 to 1% of the weight of the polymerizable material present in the composition, an amount of stabilizer of less than about 1% by weight of polymerizable material being nearly always sufficient. Illustrative of acyclic amides disclosed in U.S. Ser. No. 144,666 are:

N,N-dimethylacetamide, $CH_3-C(=O)-N(CH_3)-CH_3$

N,N-diethylacetamide, $CH_3C(=O)-N(CH_2CH_3)-CH_2CH_3$

N,N-dimethylpropionamide, $CH_3CH_2C(=O)-N(CH_3)-CH_3$

N,N-dimethyloleamide (N,N-dimethyl-9-octadecenamide), $CH_3(CH_2)_7CH{=}CH(CH_2)_7C(=O)-N(CH_3)-CH_3$ N,N-dimethylacrylamide, $CH_2{=}CHC(=O)-N(CH_3)-CH_3$ N,N-diethylbenzamide, 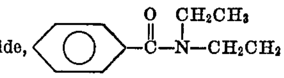

N,N-diethyl-m-toluamide, 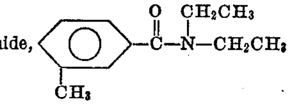

N,ethyl-N-(1-naphthyl)acetamide, 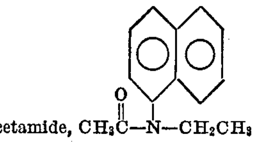

1-acetylpiperidine, $CH_3C(=O)-N-(CH_2)_4CH_2$ (ring closed between N and $CH_2$), Polymers formed from an N-vinyl-substituted amide such as N-methyl N-vinylacetamide, $CH_3C(=O)-N(CH_3)-CH{=}CH_2$, the polymeric structure presumably being

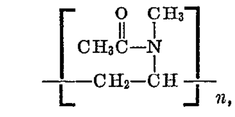

wherein n is an integer greater than 1.

Substitute urea compounds such as 1,1,3,3-tetramethylurea, $(H_3C)(CH_3)N-C(=O)-N(CH_3)-CH_3$ 1,1,3,3-tetraethylurea, $(CH_3CH_2)(CH_3CH_2)N-C(=O)-N(CH_2CH_3)-CH_2CH_3$ 1,1,3,3-tetraoctadecylurea, $(CH_3(CH_2)_{17})CH_3(CH_2)_{17}-N-C(=O)-N(-(CH_2)_{17}CH_3)-(CH_2)_{17}CH_3$ N,N'-dimethylcarbanilide,

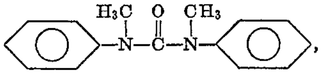

1,1'-carbonyldipiperidine (1,1-3,3-di(pentamethylene)urea), $CH_2(CH_2)_4-N-C(=O)-N-(CH_2)_4CH_2$, 1,3-dimethyl-2-imidazolidinone, $CH_3-N-C(=O)-N-CH_3$ (ring: $CH_2-CH_2$)

1,3,4,6-tetrachloroglycoluril,

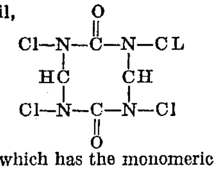

Polymers of 1-vinyl-2-pyrrolidinone, which has the monomeric formula $CH_2CH_2CH_2C(=O)-N-CH{=}CH_2$ (ring closed between $CH_2$ and N)

and their commercially available polymers such as

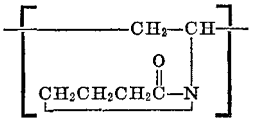

where $n$ is an integer greater than 1, such polymers having average molecular weights, for example, of about 10,000, 40,000, and 360,000.

Related heterocyclic amides which may be represented by the generalized formula

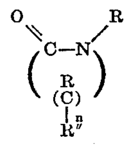

where R is an unreactive group such as (in the monomeric forms) alkyl, each of R' and R'' is hydrogen or an unreactive group, commonly alkyl, and $n$ is a lower integer of about 1 to 4; the bond as shown to an R'' group alternatively may be a double bond to an adjacent carbon atom.

Monomeric $C_4N$ heterocyclic compounds of this type where $n=3$, such as 1-alkyl-2-pyrrolidinones, including 1-methyl-2-pyrrolidinone $CH_2CH_2CH_2C(=O)-N-CH_3$ 1-ethyl-2-pyrrolidinone, $CH_2CH_2CH_2C(=O)-N-CH_2CH_3$ 1-butyl-2-pyrrolidinone, $CH_2CH_2CH_2C(=O)-N-(CH_2)_3CH_3$, etc.

Illustrative of nitriles disclosed in U. S. Serial No. 144,667 are acetonitrile, $CH_3CH_2CN$
butyronitrile, $CH_3(CH_2)_2CN$
adiponitrile, $NC(CH_2)_4CN$ phenylacetonitrile (Benzyl cyanide, an aralkyl cyanide),

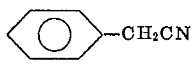

benzonitrile,

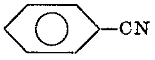

tolunitrile,

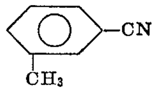

cyclohexanecarbonitrile (hexahydrobenzonitrile, a cycloalkyl cyanide),

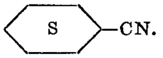

Sulfoxides disclosed in U.S. Ser. No. 144,665 include propyl sulfoxide (di-n-propyl sulfoxide),
$[CH_3(CH_2)_2]_2S{=}O$
butyl sulfoxide, $[CH_3(CH_2)_3]_2S{=}O$
hexyl sulfoxide, $[CH_3(CH_2)_5]_2S{=}O$
octadecyl sulfoxide, $[CH_3(CH_2)_{17}]_2S{=}O$ ethyl methyl sulfoxide, $CH_3CH_2-S(=O)-CH_3$ phenyl sulfoxide,

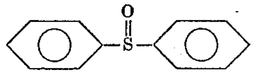

methyl phenyl sulfoxide [(methylsulfinyl)benzene],

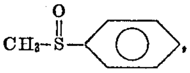

tetramethylene sulfoxide (tetrahydrothiophene, 1-oxide), $CH_2(CH_2)_3-S{=}O$, and pentamethylene sulfoxide (tetrahydro-2H-thiopyran, 1-oxide), $CH_2(CH_2)_4-S{=}O$ The polymerizable material, the catalyst precursor, and the gelation inhibitor, where employed, are provided in admixture in the stabilized polymerizable compositions of the present invention. It will be appreciated that these several components should be compatible with each other in the sense of substantial freedom from mutual chemical attack during storage prior to irradiation. Moreover, the components also should be compatible in the sense of mutual physical affinity. Thus, it would not be preferable to provide either the gelation inhibitor or the catalyst precursor in the mixture in the form of undissolved solid particles distributed therethrough, even though such solid particles might perform to some degree their intended functions, respectively, of counter-activity against prematurely formed Lewis acid, and of release of the Lewis acid catalyst upon eventual irradiation. For example, the relative insolubility of the higher molecular weight polyamides, such as most nylon and peptide materials, makes them unattractive or impractical as gelation inhibitors.

Referring to equation I hereinabove showing the photolytic decomposition of the catalyst precursor, the halide Lewis acid $PF_5$ released reacts with the epoxide or other polymerizable material with a result exemplified by the following:

$$CH_3{-}O{-}ArN_2PF_6 + \text{monomer} \xrightarrow{\text{radiation}} \text{polymer:} \quad \text{(II)}$$

The cationic catalyst is believed to act by cleaving a carbon-oxygen epoxy bond, or by opening the double bond in a vinyl (ethylenic) monomer, initiating growth of a polymeric chain nor permitting formation of a cross-linkage. A general application of the process embodied by equations I and II can be as follows: the diazonium complex salt is admixed, with or without the use of a suitable solvent, with an epoxy monomer, with or without the use of a stabilizer. The mixture is thereafter coated on a suitable substrate such as a metal plate, plastic, glass or paper, and the substrate is exposed to ultraviolet or electron beam radiation. On exposure the diazonium compound decomposes to yield the Lewis acid catalyst, which initiates the polymerization of the epoxy monomer. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compound. As previously noted, the wavelength (frequency) range of actinic radiation is chosen to obtain sufficient absorption of energy to excite the desired decomposition.

For an imaging system, the mixture, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of an epoxy polymer in this embodiment.

The polymers produced by the polymerizing process of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, microimages for printed circuitry, thermoset vesicular images, microimages for information storage, decoration of paper, glass, and packages, and light-cured coatings.

The procedures for mixing the radiation-sensitive compositions of the present invention using epoxide materials, for example, are relatively simple. The monomer or prepolymer resin, or polymerizable mixture thereof, is combined with the catalyst precursor and if desired, with a stabilizer or inhibitor as above defined, if desired with a suitable inert solvent. By such a suitable solvent is meant any solvent compound or mixture which boils below about 190° C. and which does not react appreciably with the monomer, the catalyst precursor, or the inhibitor. Examples of such solvents include acetone, sulfolane (tetrahydrothiophene 1,1-dioxide), methyl ethyl ketone, acetonitrile, anisole, dimethyl ether of diethylene glycol (bis (2-methoxyethyl) ether) or mixtures thereof.

The amount of catalyst precursor employed should be sufficient to insure the desired degree of polymerization. It has been found that quite satisfactory results are obtained by providing the diazonium complex salt in amount by weight from about 0.2% to about 5% of the catalyst precursor relative to the weight of the polymerizable material provided, about 1% or less being amply effective with some epoxide-catalyst precursor systems.

The catalyst precursor listed hereinabove is solid, and the gelation inhibitor compound which is optionally utilized in accordance with the present invention also may be a solid at room temperature. While it may be possible to dissolve such solid ingredients in one or more of the polymerizable ingredients making up the epoxide or other polymerizable material utilized in the composition, it usually is more convenient for mixing purposes to provide the solid ingredients for the mixing operation already dissolved in a solvent. In fact, the use of a small amount of a solvent medium such as acetone or anisole often is convenient for introducing liquid additives miscible in the medium, as well as solid additives. It has been found that commercial propylene carbonate (a cyclic propylene ester of carbonic acid, probably identified as primarily 4-methyl-1,3-dioxolan-2-one) makes a particularly good solvent for the aromatic diazonium complex salt and also for stabilizers, and the propylene carbonate so used is completely miscible with epoxy resins. For example, the propylene carbonate may make up approximately 1% to 2% by weight of the entire polymerizable composition. If desired to avoid substantially the disadvantages of utilizing an inert solvent medium, the total amounts of any solvents which do not participate in the polymerization reactions, including a solvent such as propylene carbonate and particularly any volatile solvents present, should be kept below about 4% by weight.

It may be desirable, however, to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursor needed rarely exceeds 5% of the entire weight of the composition, and an amount of the gelation inhibitor less than about 1% of the total weight usually is sufficient. Additionally, the photosensitivity of the diazonium compound, and hence the speed of photopolymerization may be further enhanced by the inclusion of certain photosensitizers known in the art of the chemistry of diazonium compounds. Amounts of such sensitizers but not limited to these, are anthraquinone, 1-chloroanthraquinone, primuline, acenaphthylene, naphthalene and anthracene.

Example 1 to 6

In order to demonstrate the versatility of the 4-methoxybenzene diazonium hexafluorophosphate of the present invention, a number of epoxides of different types were studied. The procedure used was to make up a solution of the epoxy in a solvent such as acetone, acetonitrile, methyl ethyl ketone, toluene or cellosolve ether and add to this solution from between 3 to 5% by weight aryl diazonium catalyst (based on dry epoxy monomer weight). The aryldiazonium compounds used were 4-methoxybenzene diazonium hexafluorophosphate and 2-chloro-4-dimethylamino-5-methoxy benzene diazonium hexafluorophosphate. In some cases it was necessary to add acetonitrile to the resulting mixture to fully dissolve the catalyst.

The solution was then coated onto dichromated aluminum by means of a draw bar, such as a Mayer rod, and allowed to dry in air. The coated plate was then exposed image wise to light from a Gates Raymaster 360 Watt Uviarc lamp. A contactcopy was made of a negative bar chart image. Exposure time ranged from less than a minute to fifteen minutes.

Following exposure, the plate was developed by washing with acetone or methyl ethyl ketone to remove the unexposed soluble areas. The insoluble exposed areas remained on the plates, forming resist images. No heating was necessary prior to development with any of the epoxy compounds tested with 4-methoxybenzene diazonium hexafluorophosphate while each system employing the amino substituted 5-methoxy diazonium initiators required heating at approximately 100° C. for about three minutes to insure good results.

Table I below summarizes some of the epoxy compounds treated by the above process. The image quality was judged on the basis of how well it adhered to the metal surface during development, the resolution of the lines of the image, and how well the unexposed areas washed off.

TABLE I

| Epoxy | Type | Average molecular weight | Epoxy, equivalent weight | Image quality |
|---|---|---|---|---|
| Dicyclopentadiene dioxide | Alicyclic monomer | 162.2 | 81.1 | Fair. |
| Glycidyl methacrylate allyl glycidyl ether copolymer. | Polyvinyl epoxy pre-polymer. | | | Good-Excellent. |
| Ciba araldite 6084 [1] | Bis-phenol-A glycidyl ether polymer. | | 875-1,025 | Do. |
| Ciba ECN 1273 [1] | Epoxy-Cresol Novolac | 1,080 | 225 | Fair-Good. |
| Ciba ECN 1299 [1] | do | 1,270 | 235 | Good-Excellent. |
| Shell Epon 1009 [2] (with 10% Ciba ECN 1299). | Bis-phenol-A glycidyl ether polymer. | | 2,500-4,000 | Good. |

The epoxy compounds listed in Table I illustrate the variety of commercial epoxy compounds suitable for use in the present above table are by no means limiting. Additionally, although the epoxy compounds listed above are solid, the process of the present invention can also be used to photopolymerize liquid epoxy monomers.

Example 7

Several large batches were prepared by mixing together the following epoxides in the indicated proportions:

| Epoxide | Epoxide blend A | | | Epoxide blend B | | |
|---|---|---|---|---|---|---|
| | Equiv. wt. | 25° C. viscosity, cps. | Parts by weight | Equiv. wt. | 25° C. viscosity, cps. | Parts by weight |
| Diglycidyl ether of bisphenol A | 172-178 | 4,000-6,000 | 20 (60.6%) | 172-178 | 4,000-6,000 | 55 |
| (3,4-epoxycyclohexyl)-methyl 3,4-epoxycyclohexanecarboxylate | 131-143 | 350-450 | 10 (30.3%) | 131-143 | 350-450 | 30 |
| Alkyl glycidyl ether in which alkyl groups are predominantly dodecyl and tetradecyl | 286 | 8.5 | 3 (9.1%) | 286 | 8.5 | 15 |

(a) A mixture of 400 g. of Epoxide blend A and 4 g. 4-methoxybenzene diazonium hexafluorophosphate dissolved in 8 g. of propylene carbonate and containing no additional additives was stored at 40° C. in a constant temperature bath and its viscosity measured employing a Brookfield viscometer. The viscosity measured after 1 hour was 195 centipoises. After 3 days at 40° C., the viscosity had increased to 858 centipoises.

(b) By comparison, a mixture identical to the formulation of (a) but in which 4 g. of p-chlorobenzene diazonium hexafluorophosphate was substituted for the 4-methoxybenzene diazonium hexafluorophosphate of the invention, gelled upon standing for 5 hours.

(c) A mixture of 0.25 g. 4-methoxybenzene diazonium hexafluorophosphate dissolved in 0.25 g. acetonitrile and added to 25 g. of Epoxide Blend A produced a formulation which was a very light yellow whereas the same formulation with the p-chloro derivative is orange.

Examples 8 to 14

Mixtures of epoxide blends of Example 7 with benzene diazonium hexafluorophosphates were prepared with addition of various stabilizers in the amounts indicated in the Table which follows and viscosities of the resultant compositions were determined employing a Brookfield Viscometer at 40° C. unless otherwise indicated. 400 g. of epoxy blend was admixed with 4 g. of catalyst and 8 g. of stabilizer solution unless otherwise indicated.

TABLE II

| | Epoxide | Benzene diazonium hexafluorophosphate | Solvent | Stabilizer | Viscosity |
|---|---|---|---|---|---|
| Example 8: | | | | | |
| (a) | Blend A | 4-methoxy | Sulfolane | | (a) After 1 hr.—217 cps. after 23 hrs.—337 cps. Still fluid after 13 days. |
| (b) | do | 4-cloro | do | | (b) After 1 hr.—334 cps. After 23 hrs.—gelled. |
| Example 9: | | | | | |
| (a) | do | 4-methoxy | Propylene carbonate | | (a) After 1 hr.—195 cps. After 3 days—858 cps. |
| (b) | do | 4-chloro | do | | (b) Gelled after 5 hrs. |
| Example 10: | | | | | |
| (a) | do | 4-methoxy | do | Poly(vinyl pyrrolidone) (20% solution). | (a) After 1 hr.—210 cps. After 47 hrs.—214 cps. After 13 days—still fluid. |
| (b) | do | 4-chloro | do | do | (b) After 1 hr.—211 cps. After 47 hrs.—600 cps. After 3 days—gelled. |
| Example 11: | | | | | |
| (a) | Blend A (50 g.) | 4-methoxy 0.5 g | do | Poly(vinyl pyrrolidone) (20% solution). | Light yellow. |
| (b) | do | 4-chloro 0.5 g | do | do | Light orange. |
| (c) | Blend B (100 g.) | 4-methoxy (1.0 g.) | do | Acetonitrile (1.0 g.) | Light yellow. |
| (d) | do | 4-chloro (1.0 g.) | do | do | Light orange. |

TABLE II.—Continued

| | Epoxide | Benzene diazonium hexafluorophosphate | Solvent | Stabilizer | Viscosity |
|---|---|---|---|---|---|
| Example 12: | | | | | |
| (a) | Blend A | 4-methoxy | Propylene carbonate | Poly(vinylpyrrolidone) (20% solution). | (a) Initial light yellow color. After 3 hrs.—210 cps. After 3 days—241 cps. After 7 days—527 cps. |
| (b) | do | 2-methoxy | do | do | (b) Initial orange color. After 3 hrs.—195 cps. After 3 days—313 cps. After 7 days—5,930 cps. |
| Example 13: | | | | | |
| (a) | do | 4-methoxy | 2% Anisole in sulfolane | | (a) After 3¼ hrs.—233 cps. After 3 days—895 cps. After 6 days—2,255 cps. |
| (b) | do | 2-methoxy | do | | (b) After 3¼ hrs.—233 cps. After 3 days—1,790 cps. After 6 days—gelled. |
| (c) | do | 4-methoxy | Sulfolane | | (c) After 1¾ hrs.—724 cps. @ 25°. After 3 days—995 cps. @ 25°. |
| (d) | do | 2-methoxy | do | | (d) After 1¾ hrs.—665 cps. @ 25°. After 3 days—1,485 cps. @ 25°. |
| Example 14: | | | | | |
| (a) | do | 4-methoxy | Propylene carbonate | Poly(vinylpyrrolidone) (20% solution). | (a) After 1¾ hrs.—665 cps. @ 25°. After 24 days—1,940 cps. @ 25°. |
| (b) | do | 2-methoxy | do | do | (b) After 1¾ hrs.—686 cps. @ 25°. After 24 days—3,792 cps. @ 25°. |

It will be apparent from the above, that compositions containing the catalyst of the invention are superior to compositions containing closely related catalysts in terms of longer shelf life, with or without reaction stabilizers or gelation inhibitors and are useful for many applications mentioned hereinabove.

It is thought that the invention and many of its attendant advantages will be understood from the foregoing description and it will be apparent that various changes may be made in the matter of the ingredients, their identity, and their proportions and in the steps of the process and their order of accomplishment without departing from the spirit and scope of the invention or sacrificing all of its material advantages, the form hereinabove described being merely a preferred embodiment thereof.

What is claimed is:

1. A stabilized polymerizable composition, comprising:
   a monomeric or prepolymeric epoxide material and mixtures thereof polymerizable to higher molecular weights through the action of a cationic catalyst and,
   as a radiation-sensitive catalyst precursor which decomposes upon exposure to actinic or electron-beam irradiation to provide a Lewis acid effective to initiate polymerization of said polymerizable material, 4-methoxybenzene diazonium hexafluorophosphate, said catalyst precursor being present in an amount equal to between about 0.2% and about 5% of the weight of the polymerizable material present in the composition.

2. The composition of claim 1, in which the monomeric or prepolymeric polymerizable material is a mixture of epoxides.

3. The composition of claim 1, in which a gelation inhibitor is present.

4. The composition of claim 1, in which said gelation inhibitor is a sulfoxide.

5. The composition of claim 4, in which the gelation inhibitor is diphenyl sulfoxide.

6. The composition of claim 3, in which said gelation inhibitor is an acyclic amide.

7. The composition of claim 6, in which said gelation inhibitor is a N,N-dimethyl acetamide.

8. The composition of claim 6, in which the gelation inhibitor is 1,1,3,3-tetramethylurea.

9. The composition of claim 1, in which the gelation inhibitor is a cyclic amide.

10. The composition of claim 9, in which the gelation inhibitor is poly(1-vinyl-2-pyrrolidone).

11. The composition of claim 3, in which the gelation inhibitor is a nitrile.

12. The composition of claim 11 in which the gelation inhibitor is acetonitrile.

13. The composition of claim 3, in which said gelation inhibitor is present in an amount by weight equal to between about 0.005% to about 1% of the weight of the composition.

14. The composition of claim 1, in which the total amount of any unpolymerizable volatile solvents present in said composition is less than about 4% by weight of the composition.

15. The process of polymerizing a monomeric or prepolymeric epoxide material and mixtures thereof polymerizable to higher molecular weights through the action of a cationic catalyst, comprising:
   forming a mixture of the polymerizable material, with 4-methoxybenzene diazonium hexafluorophosphate,
   and subsequently exposing the resulting mixture to actinic or electron-beam irradiation to release said Lewis acid in sufficient amounts to effect substantial polymerization of the polymerizable material, said 4-methoxybenzene diazonium hexafluorophosphate being mixed with said polymerizable material in an amount equal to between about 0.2% and about 5% of the weight of the polymerizable material.

16. The process of claim 15, in which the monomeric or prepolymeric material is a mixture of epoxides.

17. The process of claim 16, in which a gelation inhibitor is admixed with the polymerizable material and the catalyst precursor.

18. The process of claim 15, in which said irradiation is actinic irradiation.

19. The process of claim 17, in which said gelation inhibitor is mixed with said polymerizable material and said catalyst precursor in an amount equal to between about 0.005% and about 1% of the weight of the resulting mixture.

20. The process of claim 19, in which said mixture formed of the polymerizable material, the catalyst precursor, and the gelation inhibitor contains less than about 4% by weight of any unpolymerizable volatile solvents which may be present therein.

(References on following page)

References Cited

UNITED STATES PATENTS

| | | | |
|---|---|---|---|
| 3,721,616 | 3/1973 | Watt | 204—159.11 |
| 3,721,617 | 3/1973 | Watt | 204—159.11 |
| 3,708,296 | 1/1973 | Schlesinger | 96—33 |
| 3,236,784 | 2/1966 | Fischer et al. | 204—159.11 |
| 3,711,390 | 1/1973 | Feinberg | 204—159.11 |
| 3,711,391 | 1/1973 | Feinberg | 204—159.11 |

MURRAY TILLMAN, Primary Examiner

R. B. TURER, Assistant Examiner

U.S. Cl. X.R.

96—75, 91 R, 114, 115 P; 117—93.31, 32 BE, 38.8 N, 155 R; 204—159.14, 159.22, 159.23, 159.24, 159.18; 260—2 EP, 2 BP, 47 EP, 47 R, 45.8 NZ, 78.3 R, 45.9 R, 45.9 P, 45.7 S